United States Patent Office 2,733,195
Patented Jan. 31, 1956

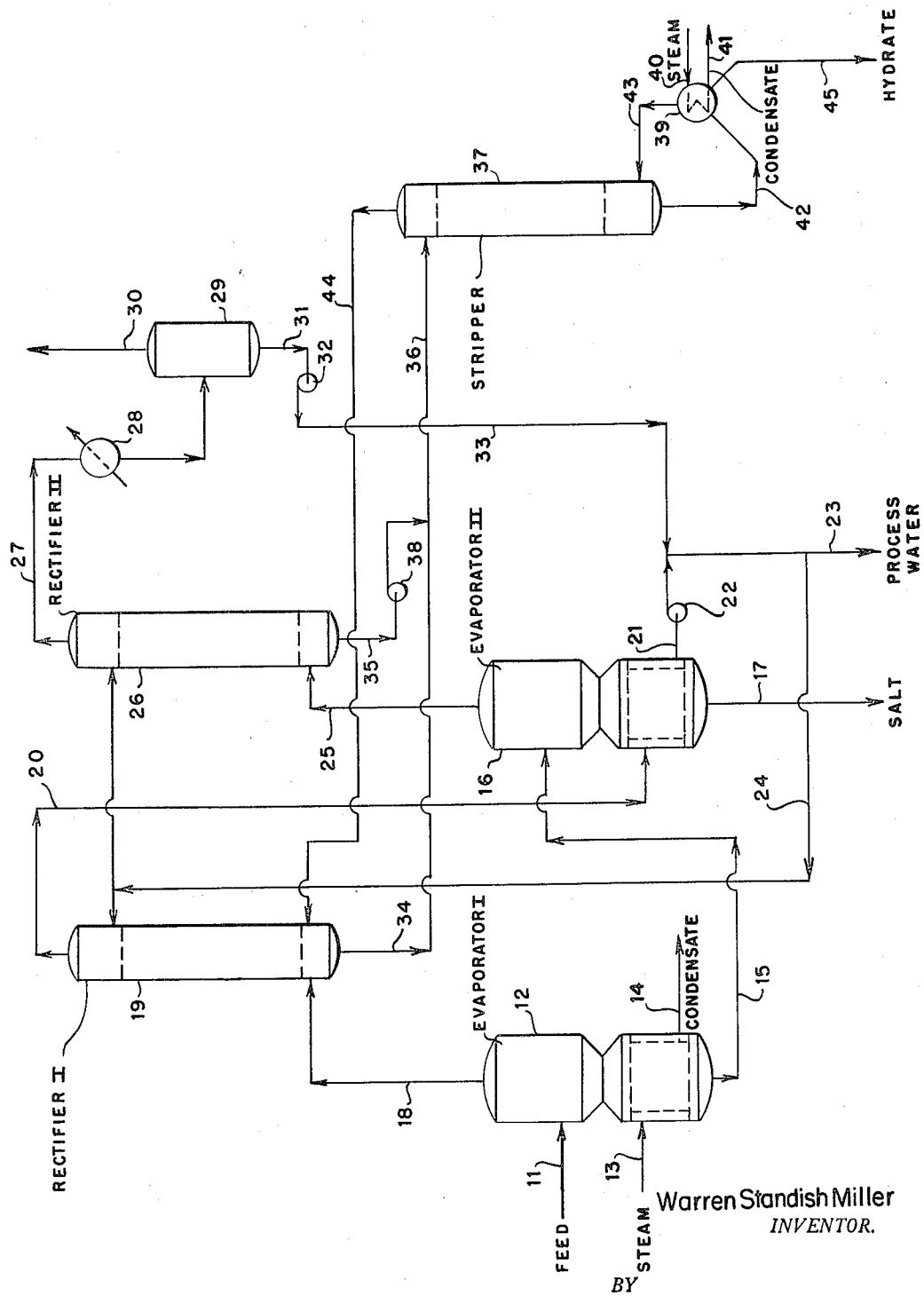

2,733,195

PROCESS FOR CONCENTRATING AQUEOUS HYDRAZINE SOLUTIONS

Warren Standish Miller, Baltimore, Md., assignor to Olin Mathieson Chemical Corporation, a corporation of Virginia Application September 1, 1954, Serial No. 453,501

10 Claims. (Cl. 202—45)

My invention relates to improvements in multiple effect evaporation and in particular to improvements in the use of multiple effect evaporation in the concentration of dilute aqueous hydrazine.

In the Raschig and other processes for the manufacture of hydrazine, hydrazine is first obtained in a dilute aqueous liquor containing from 1 to 3% of hydrazine and considerable quantities of dissolved sodium chloride. The separation of hydrazine from these liquors as a product having a concentration approximating that of hydrazine monohydrate may be accomplished, for example, by evaporation and fractionation.

The operation of multiple effect evaporators in which the vapor from one stage is used as heating medium for a subsequent stage is well known. While the capital cost of installation of equipment is higher, the operating cost of evaporation is reduced almost directly in proportion to the number of stages. In the application of multiple effect evaporation to the manufacture of hydrazine hydrate from dilute aqueous hydrazine, however, serious losses of hydrazine may be encountered due to the vapor pressure of hydrazine hydrate. Since hydrazine hydrate boils at 118.5° C. at 739.5 mm., significant quantities of hydrazine are present in the vapors from the evaporation of solutions more dilute than the monohydrate and thus serious losses may occur.

I have devised a process for concentrating dilute aqueous hydrazine solutions to produce hydrazine hydrate utilizing a modified multiple effect evaporation system with interstage rectification which avoids hydrazine losses while obtaining the attendant advantages of reduced operating costs and other economic advantages.

According to my invention, dilute aqueous hydrazine is charged to an evaporating system comprising two or more evaporating zones maintained under suitable differential pressure, at least one of which zones is heated by an external source, usually steam, and the others are heated by vapor effluent from another evaporating zone. Rectifying zones are interposed following each evaporating zone to rectify vapor effluent from the evaporating zones and to recover aqueous hydrazine from the vapor effluent. Vapor effluent from the rectifying zones, except the last zone, is used as the heating medium for the succeeding evaporating zone. Hydrazine hydrate is recovered from the aqueous hydrazine, recovered from the rectifying zones, by distillation, e. g. in a stripping zone.

Thus, by providing interstage rectification of vapor effluent in a multiple effect evaporating system I avoid hydrazine losses and also effect substantial savings in heat supply requirements in that vapor effluent is used in another stage of evaporation.

In a more particular embodiment of my invention, dilute aqueous hydrazine is fed to an evaporator of a conventional type which is heated by steam. The extent of evaporation in the first stage is limited to avoid the precipitation of sodium chloride. The bottoms are charged to a second evaporator which is operated as an evaporator and also as a salt crystallizer. As in conventional practice, the slurry of salt may be removed to a settler or filter, the salt being washed and discarded. The aqueous portion of the liquor and washings are returned to the second evaporator. The overhead stream from the first evaporator, instead of being introduced directly into the heating jacket of the second evaporator as in conventional practice, is conducted to a rectifying column operating to recover aqueous hydrazine as a bottom product. Pure water, taken overhead from the rectifier as steam, is then charged to the jacket of the second evaporator and the condensate used partly as reflux and partly as process water for the synthesis reaction. Similarly, the overhead stream from the second evaporator passes to a second rectifying column for the recovery of aqueous hydrazine as a bottom product, removing substantially pure water overhead. The latter may be combined with the steam condensate from the second evaporating zone and used as process water. Bottoms from both rectifiers are combined and passed to a stripper heated, for example, by a steam reboiler. Hydrazine hydrate is obtained as bottoms from the stripper and the overhead is returned to the first rectifying column for the recovery of hydrazine contained therein.

As in conventional multiple effect evaporation, the evaporating zones are maintained at suitable differential pressures so that the vapor from the first evaporating zone after passing through the first rectifying column contains sufficient heat and is at a sufficiently high temperature to produce the desired evaporation in the second evaporating zone. For this purpose a vacuum may be drawn on the system at the top of the second rectifier while the first evaporator and rectifier operate at atmospheric pressure. Alternatively, the first evaporator and rectifier may be operated at superatmospheric pressure and the second evaporator and rectifier at atmospheric pressure. In this case, steam of higher pressure and temperature is required for heating the first evaporating zone than when the latter operates at atmospheric pressure. In practicing this alternative, the vapor from the stripper is preferably introduced into the second rectifier.

The stripper preferably is operated at atmospheric pressure or slightly above for safety reasons. When the stripper is operated at slightly above atmospheric pressure conventional alternatives in flow arrangement for multiple effect evaporation may be used, for example, the feed may be supplied to the second evaporating zone and the bottoms charged to the first evaporating zone. The stripper may be divided into two sections with the advantage that only the second section contains aqueous hydrazine of sufficient concentration to present any hazard. It may be physically remote from the rest of the plant or separated therefrom by protective construction. An important advantage of my invention is that the stripper, or the second section thereof when that alternative is practiced, is the only part of the system containing aqueous hydrazine in a concentration presenting any hazard.

The invention provides the usual advantage associated with multiple effect evaporation in that the vapor overhead from the evaporators is used in another stage of evaporation. In addition, however, the vapor overhead from the stripper is used in a rectifier as well as in the jacket of an evaporator. For this reason the steam necessary for double effect evaporation is markedly less than that required by single stage evaporation.

One advantageous mode of practicing the process of my invention will be illustrated by reference to the accompanying drawing which is a schematic flow diagram of a double effect modified evaporating system.

In the drawing, feed comprising an aqueous liquor containing about 1.5% of hydrazine and about 12% of salt is introduced by means of line 11 to the first evaporator 12. The evaporator 12 is heated by steam introduced by means of line 13 and condensate is removed by means of line 14.

The concentrated liquor is removed by means of line 15 from the bottom of the first evaporator 12 and charged to the body of the second evaporator 16. Salt crystals are removed from evaporator 16 by means of line 17.

The overhead from the first evaporator 12 passes by means of line 18 to the first rectifier 19. Steam, free from hydrazine, is removed overhead by means of line 20 and is introduced into the heating coils of the second evaporator 16. Condensate is removed by means of line 21 and pump 22 for use partly as reflux to the rectifiers and partly as process water. The process water is removed by means of line 23 and the reflux returned by means of line 24 to the top of the rectifiers. The overhead stream from the second evaporator passes by means of line 25 to the second rectifier 26. The overhead water passes by means of line 27 through condenser 28 to receiver 29. Vacuum is maintained on the second stage by means of line 30 connected to receiver 29. Condensate is removed by means of line 31 and pump 32 through line 33 to combine with the process water in line 23. Bottoms from the rectifiers 19 and 26 pass by means of lines 34 and 35 to a common line 36 and are charged to stripper 37. Pump 38 is required in line 35 to raise the pressure from that of the second rectifier 26 to that of the first rectifier 19 and stripper 37.

Reboiler 39, utilizing steam introduced by means of line 40, condensate being removed by means of line 41, reboils the bottoms removed from the stripper by means of line 42 and returns vapors by means of line 43 to stripper 37. The overhead stream from the stripper passes by means of line 44 to the bottom of the first rectifier 19 for the recovery of hydrazine hydrate therefrom. The product, hydrazine hydrate, is removed by means of line 45 from reboiler 39.

I claim:

1. In the production of hydrazine hydrate from aqueous hydrazine solutions by concentration, the method which comprises evaporating aqueous hydrazine in at least two evaporating zones maintained under suitable differential pressures in which bottoms are removed from a preceding evaporating zone to a succeeding evaporating zone, at least one of which evaporating zones is heated by an external source of heat and the others of which are heated from vapor effluent from another evaporating zone, and rectifying vapor effluent from each evaporating zones in rectifying zones provided for each evaporating zone from which rectifying zones aqueous hydrazine is recovered and from which rectifying zones except the last rectifying zone vapor effluent is introduced into a heating element of the succeeding evaporating zone, and recovering hydrazine hydrate by distillation from the aqueous hydrazine solution obtained from the rectifying zones.

2. The method of claim 1 in which the first evaporating zone is operated under substantially atmospheric pressure and the last evaporating zone under a vacuum.

3. The method of claim 1 in which the first evaporating zone is operated under superatmospheric pressure and the last evaporating zone under substantially atmospheric pressure.

4. The method of claim 1 in which the number of evaporating zones is two.

5. In the production of hydrazine hydrate from aqueous hydrazine solutions by concentration, the method which comprises evaporating aqueous hydrazine in a first evaporating zone which is heated by an external source of heat, removing bottoms from the first evaporating zone and charging said bottoms into a second evaporating zone, said evaporating zones being maintained under suitable differential pressure, removing vapor effluent overhead from the first evaporating zone to a first rectifying zone, removing bottoms comprising aqueous hydrazine from the first rectifying zone to a stripping zone, removing vapor effluent from the first rectifying zone to a heating element of the second evaporating zone, removing salt from the second evaporating zone, removing vapor effluent overhead from the second evaporating zone to a second rectifying zone, removing bottoms comprising aqueous hydrazine from the second rectifying zone to the stripping zone, and recovering hydrazine hydrate from the stripping zone.

6. The method of claim 5 in which the first evaporating zone is maintained under substantially atmospheric pressure and the second evaporating zone under a vacuum.

7. The method of claim 6 in which vapor from the stripping zone is introduced into the first rectifying zone.

8. The method of claim 5 in which the first evaporating zone is maintained under superatmospheric pressure and the second evaporating zone under substantially atmospheric pressure.

9. The method of claim 8 in which vapor from the stripping zone is introduced into the second rectifying zone.

10. The method of claim 5 in which the stripping zone is divided into two sections.

No references cited.